United States Patent [19]
Christian et al.

[11] Patent Number: 5,531,483
[45] Date of Patent: Jul. 2, 1996

[54] HEAT SHRINKABLE HOSE CLAMP WITH HEATING INDICATOR

[75] Inventors: Richard E. Christian, Morrison; Michael V. Peake, Evergreen, both of Colo.

[73] Assignee: The Gates Rubber Company, Denver, Colo.

[21] Appl. No.: 163,211

[22] Filed: Dec. 6, 1993

[51] Int. Cl.⁶ .................................................. F16L 35/00
[52] U.S. Cl. ........................... 285/93; 285/381.4; 156/86; 264/230
[58] Field of Search ........................... 285/93, 381, 21; 24/90 HA, 447, 448, 17 PB; 174/DIG. 8; 156/86; 264/230

[56] References Cited

U.S. PATENT DOCUMENTS

| | | | |
|---|---|---|---|
| 3,315,986 | 4/1967 | Quick | 285/21 |
| 3,975,039 | 8/1976 | Penneck et al. | 285/381 X |
| 4,650,228 | 3/1987 | McMills | 285/381 |
| 4,686,071 | 8/1987 | Rosenzweig | 285/93 X |
| 4,727,242 | 2/1988 | Barfield | 285/93 X |
| 4,732,412 | 3/1988 | van der Linden et al. | 285/47 |
| 4,869,533 | 9/1989 | Lehmann et al. | 285/93 X |
| 5,116,082 | 5/1992 | Handa et al. | 285/93 X |
| 5,169,176 | 12/1992 | Brossard | 285/381 X |

FOREIGN PATENT DOCUMENTS

| | | |
|---|---|---|
| 0253712 | 1/1988 | European Pat. Off. . |
| 0388764 | 9/1990 | European Pat. Off. . |
| 8604542 | 8/1986 | WIPO . |

OTHER PUBLICATIONS

International Search Report from the European Patent Office re: co-pending U.S. application Ser. No. 07/841,951.
Co-pending U.S. application Ser. No. 07/841,951.

*Primary Examiner*—Dave W. Arola
*Attorney, Agent, or Firm*—S. G. Austin; H. W. Oberg; C. H. Castleman

[57] ABSTRACT

The invention is an improved hose clamp of the type formed of a band of heat shrinkable polymer having a diameter reducing released temperature, an inside band surface and an outside band surface. It is improved by the inclusion of a heating indicator.

13 Claims, 2 Drawing Sheets

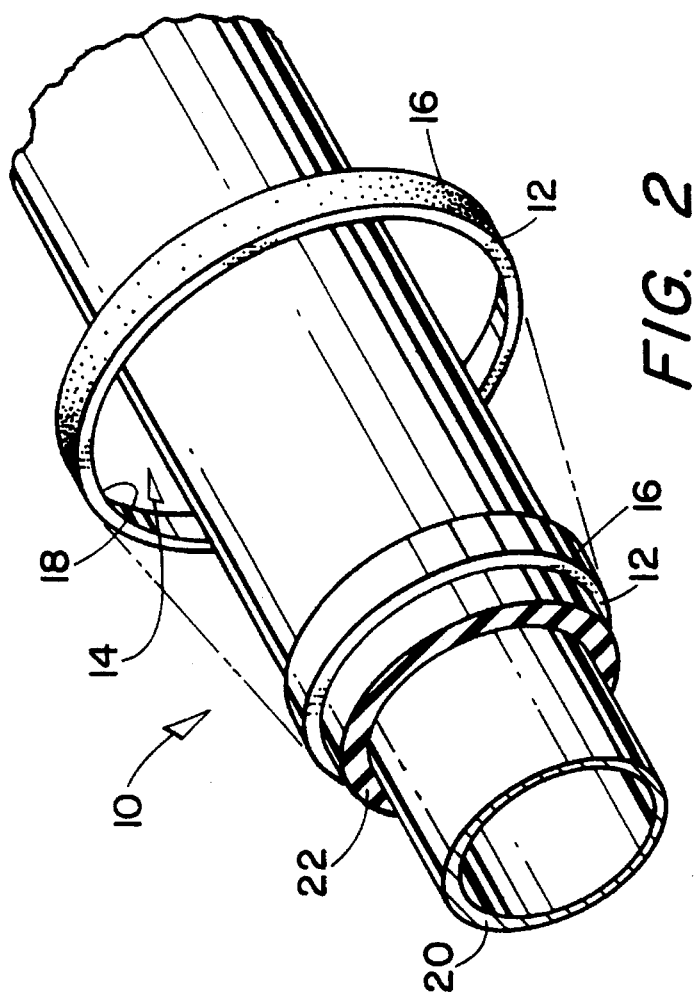
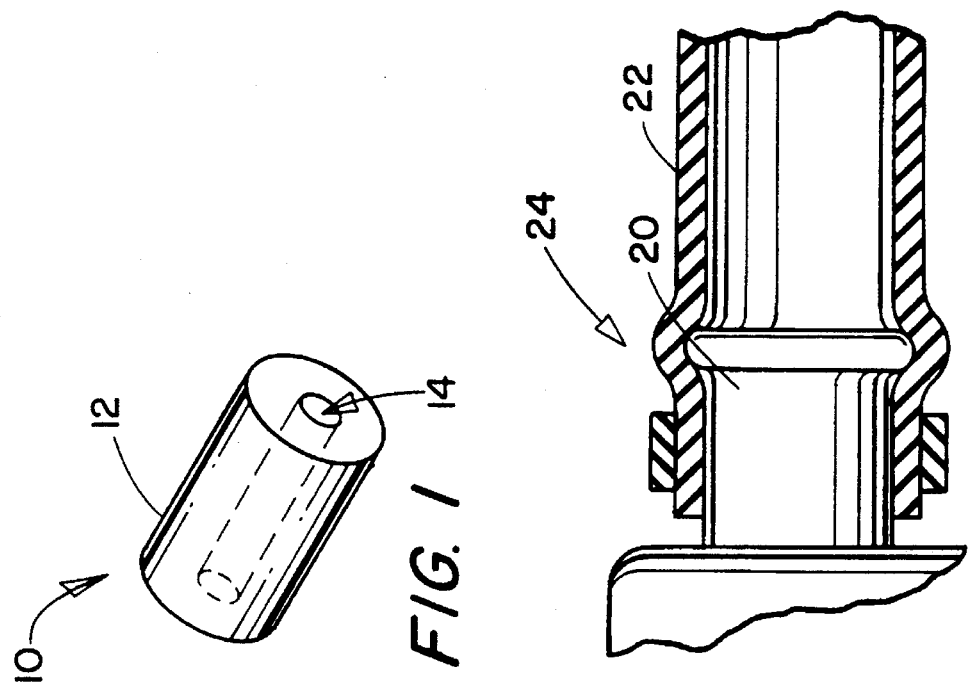

HEAT SHRINKABLE HOSE CLAMP WITH HEATING INDICATOR

BACKGROUND OF THE INVENTION

1. Field of the Invention

The invention relates generally to the clamping of elastomeric hose and tubing to fixtures and hose coupling devices and to the use of bands of heat shrinkable polymer to provide a constrictive force about elastomeric hose and tubing. More particularly, this invention relates to an improved heat shrinkable hose clamp where a device is incorporated to get positive indication of when the heat shrinkable clamp is adequately heated to effect its intended purpose. Specifically, the invention relates to a heating indicator, that forms part of the heat shrinkable hose clamp, that indicates proper installation including adequate heat application to the clamp to effect adequate clamping force.

2. Description of the Prior Art

Elastomeric hose and tubing, hereinafter generically referred to as hose, are commonly used to convey various fluids, where those fluids are under a variety of pressures and temperatures, as part of a fluid transport system. For these systems to be operable, the connections between hoses and the items with which the hoses fluidly communicate must be fluid tight and able to resist separation that would otherwise occur because of the influence from the fluid pressure, or blow-off, as well as surrounding environment, or pull-off. Commonly, these connections are made by placing the open end of the hose over a stem or coupling insert. The hose and the associated stem or insert are ordinarily sized and shaped to allow the opening of the hose to slip over the stem or insert and to seat with a snug fit. For systems operating at certain pressures and in certain environments, nothing more is required. More typically, however, a hose clamp is installed near the open end of the hose, urging the hose more tightly upon the stem or insert to resist leakage, blow-off, and pull-off.

Hose clamps have been produced in various sizes, shapes, and materials. One style of hose clamp is formed of a band of heat shrinkable polymer. Hose clamps of this type are more fully discussed in U.S. Pat. No. 5,340,167, Morse, which is incorporated herein by reference. Such a material is mechanically expanded, stretched or oriented and formed into a band. Once the temperature of the material forming the band is sufficiently elevated, a portion of the energy, that is put into the material through the orientation process, will be released, as manifest by the band tending to shrink to its original or pre-oriented dimensions. The temperature at which this shrinkage begins is commonly referred to as the release temperature, as that is the temperature at which the stored energy of orientation is released. In the case of the material formed into a ring or band, this temperature can logically be referred to as the diameter reducing release temperature.

In use; the heat shrinkable hose clamp is placed about an end of a hose; the hose is placed upon some type of hose insert or stem, such as would be encountered on an automotive radiator, hose-to-hose connector, or other device or mechanism to which a fluidic connection is desired; and heat is applied to the clamp until shrinkage occurs and appears or is guessed to be sufficient.

On any hose clamp installation, the one doing the installation ordinarily relies on past performance of similar or like clamps to be satisfied that the installation, just effected, will produce the desired result (i.e., maintain the hose connection against the expected environment and maintain a fluid-tight seal). There is rarely, if any, feedback to the installer that the particular installation at hand will prove to be satisfactory. Feedback, of this type, would have the obvious advantage of improving quality in hose connections. This is particularly true where heat shrinkable hose clamps are involved, as heat shrinkable hose clamps are not only susceptible to the problems that would interfere with any hose clamp installation being satisfactory (e.g., mis-sizing of a clamp, mis-alignment of the clamp, or the clamp itself being faulty), it also has the consideration of proper application of heat. If the heat applied is insufficient or poorly distributed about the heat shrinkable clamp, then conceivably, the clamp will not produce adequate clamping force to produce the desired result.

Co-pending application, Ser. No. 08/057,242, discusses the incorporation of a shrinkage indicator comprising a viscous material interposed between the hose and the clamp. The viscous material softens when heated, but remains adequately thick so that substantial flow only occurs either out from under the clamp, becoming visible along the edges, or through breaches in the clamp, becoming visible on the outer surface of the clamp adjacent to the breaches, upon adequate changing force being produced. While, such an indicator imparts many advantages to the clamp, it is subject to additional expense in manufacture and some difficulty with quality control and aesthetics.

Accordingly, there remains the need to produce positive indication that the heat shrinkable hose clamp, just installed, has been appropriately heated, and therefore is likely to produce adequate clamping force to achieve the desired result, while at the same time being cost efficient, aesthetically pleasing and easily susceptible to the maintenance of high quality.

SUMMARY OF THE INVENTION

Accordingly, the present invention has as an object the provision of an improved heat shrinkable hose clamp that incorporates an improved indicator means that provides feedback as to the appropriateness of the heating of the clamp, at the time of installation. To achieve the foregoing and other objects in an accordance with the purpose of the present invention, as embodied and broadly described herein, a heat shrinkable hose clamp and indicator is disclosed herein. The invention is an improved hose clamp of the type formed of a band of heat shrinkable polymer having a diameter reducing release temperature, an inside band surface and an outside band surface. It is improved by the inclusion of a heating indicator.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principals of the invention. In the drawings:

FIG. 1 is a perspective view of a preferred embodiment of the present invention prior to orientation of the heat shrinkable polymer material.

FIG. 2 is a cut away perspective view of the preferred embodiment illustrating the oriented polymer before being heat shrinking into position.

FIG. 3 is a cut away view depicting a preferred embodiment applied to the hose upon a stem.

DETAILED DESCRIPTION OF THE PREFERRED EMBODIMENTS

Figure 4:
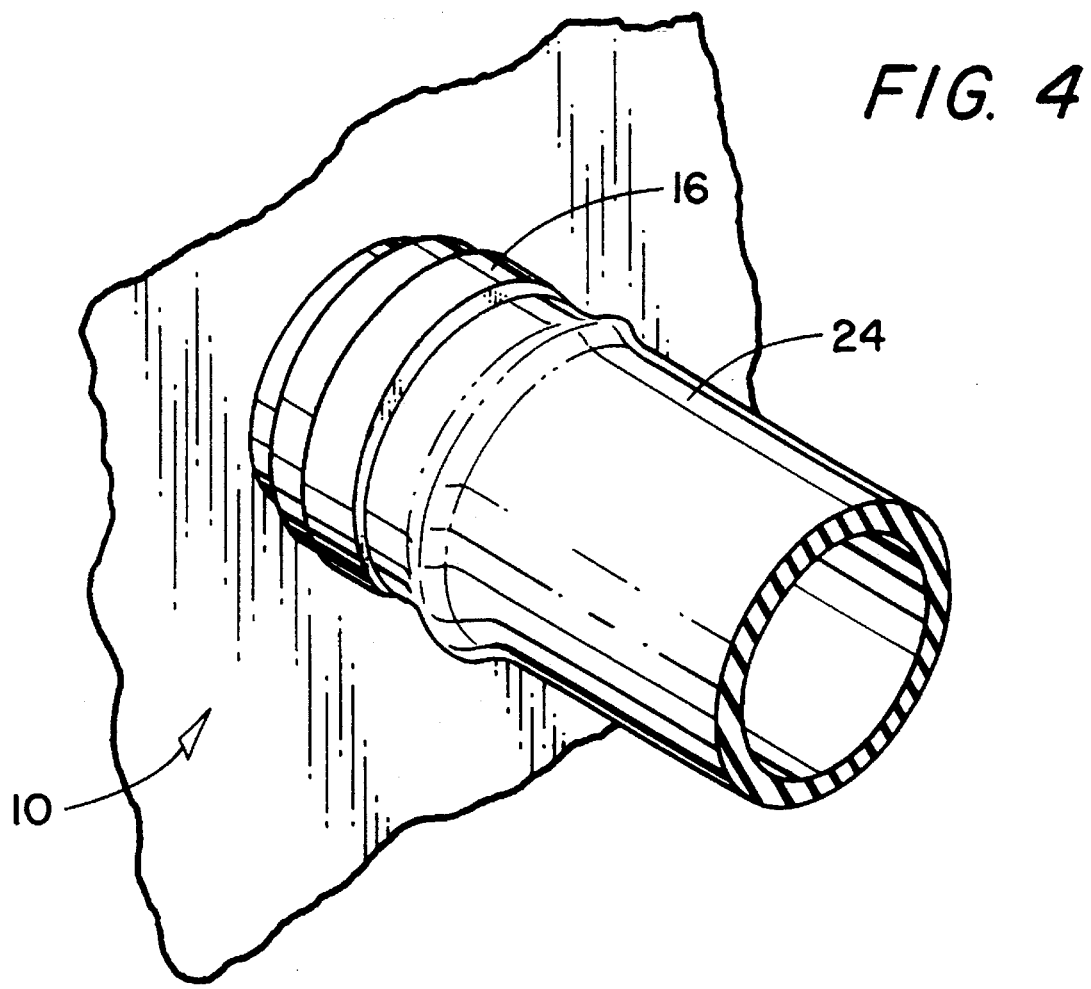
FIG. 4 is a perspective view depicting a preferred embodiment applied to the hose upon a stem.

Referring to FIGS. 1 and 2, there is shown a preferred embodiment of the present invention in the form of a heat shrinkable polymer hose clamp 10 in its nonoriented, pre-expanded state. The clamp 10 is formed by first extruding a tube 12 of the clamp material with a bore 14, and cut to length, as shown. The tube is then mechanically expanded, taking on the appearance depicted in FIG. 2 at the position right of the phantom lines. This mechanical expansion is performing polymer orientation, which is the process of mechanically deforming the polymer material so as to put energy into the molecular structure of the material by generating stress within the polymer structure, that can later be released. The stress release is manifest by the polymer material reshaping toward the shape it occupied prior to polymer orientation.

At this point, the outer surface 16 of a hose clamp 10, of the type disclosed in Morse '167, is abraded. Essentially, any generally known mechanical approach for roughening, changing the luster, or otherwise altering the appearance of the outer surface 16 by abrasion (e.g., rubbing with emery cloth, sand paper, scotchbrite®, wire brush, grinding stone, file, or etc.) can be used. It is also contemplated that chemical abrasion may be used.

Surprisingly, for the clamps fully described in Morse '167, the abrasion leads to a surface effect that indicates when the clamp has been appropriately heated. For example, for a clamp formed of a co-polymer, black in color, and abraded by any of the above-mentioned tools, appropriate heating is indicated by the surface of the abraded portion of outer surface 16, changing in color from off-white to black. Apparently, this color change occurs upon the outer surface 16 of the polymer reaching its melt point. For other material and color combinations, the surface effect may be different. The color change may be different or may not even be involved. Rather, the surface effect may be a change in the texture or luster of the surface, such as from rough to smooth or dull to shiny.

There is believed to be a relationship involving the thickness of the band, the thermal conductivity of the material used, the diameter reducing release temperature chosen, the melt point of the material used, and the rate of heating. For all applications and embodiments that can be regarded as normal, all rates of heating less than extremely high are usable. However, for those unusual applications where the band is very thick, the thermal conductivity is very low, the release temperature is very close to the melt point, or a combination of these, heating rates will become limited. Although the heating rates may be limited in these situations, rates are expected to be quantifiable, and thus manageable.

Regardless of the character of the surface effect that results, from the abrasion, it is fundamental that a visible surface effect occurs upon the clamp being appropriately heated to effect clamping. Appropriate heating occurs when enough of the band has been heated above its diameter reducing release temperature, for a given application.

The amount of the outer surface 16 subjected to the abrasion is application specific. For some applications it may be desirable to have the entire outer surface 16 prepared to exhibit the surface effect. For others, it may be beneficial to prepare only that portion of the surface that will be readily visible at the time of installation. Further, there may be applications where a design, trademark, or even installation instructions, made temporarily visible by the surface preparation, would be desirable. As a minimum the amount of abrasion, while application and abrasion method specific, should be adequate to provide distinct visual features. As a maximum, it has been found with a preferred method of rubbing the outer surface 16 with scotchbrite®, abrasion should cease when prior to degradation of the band.

The hose clamp 10 is now prepared for placement about the connection end of elastomeric hose for clamping the hose to a stem or other hose insert 20, as depicted in FIGS. 2 and 3. The stem or other insert 20 can be associated with any fluid transport system. The application of the clamp 10 generally involves placing the clamp 10 loosely about the hose 22, at the connection end 24, placing the connection end 24 about the stem or insert 20, then heating the clamp 10 to a temperature where shrinkage will occur, referred to as the diameter reducing release temperature. The temperature is maintained at or about the release temperature, at least, until the clamp 10 shrinks down to fit very snugly about the connection end 24, as depicted in FIGS. 3 and 4 and in the position left of the phantom lines in FIG. 2. It can be seen at this point that, if a sufficient portion of tube 12 reaches diameter reducing release temperature, the constrictive or clamping force applied by the clamp 10 is substantially uniform.

The heating of clamp 10 can be by various conductive, convective, or radiation techniques. Those being the placement of a hot object directly upon the outer surface 16 of clamp 10, flowing hot fluid upon clamp 10, or shining a heat lamp upon clamp 10.

Also, if the heat applied is appropriate, the surface effect will occur, giving positive indication that appropriate heating has occurred.

The ultimate result is a hose clamp that is aesthetically pleasing, and includes an integral indicator to provide feedback of appropriate heating without adding undue expense in the production of the clamp.

The foregoing description and illustrative embodiments of the present invention have been shown on the drawings and described in detail in varying modifications and alternative embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

What is claimed is:

1. An improved hose clamp of the type formed of a band of heat shrinkable polymer having a diameter reducing release temperature, an inside band surface and an outside band surface, wherein the improvement comprises, said hose clamp including a heating indicator means for visual indication by surface effect.

2. The improvement of claim 1 wherein said surface effect being said heating indicator visibly changes character upon said hose clamp being appropriately heated.

3. The improvement of claim 2 wherein said visible character change is a color change.

4. The improvement of claim 3 wherein said visible character change is a texture change.

5. The improvement of claim 4 wherein said visible character change is a luster change.

6. The improvement of claim 1 wherein said heating indicator comprises said outside band surface being abraded.

7. A hose and heating indicated hose clamp comprising: said hose; and said heating indicated hose clamp being formed of a heat shrinkable polymer having a diameter reducing release temperature, an inside band surface, and an outside band surface with a heating indicator means for visual indication by surface effect.

8. The combination of claim 7 wherein said surface effect being said heating indicator visibly changes character upon said hose clamp being appropriately heated.

9. The combination of claim 8 wherein said visible character change is a color change.

10. The combination of claim 9 wherein said visible character change is a texture change.

11. The combination of claim 10 wherein said visible character change is a luster change.

12. The combination of claim 11 wherein said heating indicator comprises said outside band surface being abraded.

13. A method of producing a hose clamp with a heating indicator comprising the steps of:

forming a band of a heat shrinkable polymer, having a diameter reducing release temperature, and inside band surface and an outside band surface; orienting said heat shrinkable polymer by stretching said band; and forming said heating indicator by abrading at least a portion of said outside band surface.

* * * * *